Feb. 7, 1956

T. DOUMA

DIRECTIONAL APPARATUS FOR USE WITH HIGH FREQUENCY TRANSMISSION LINES

Filed Jan. 12, 1953

2,734,169

INVENTOR.
Tjiske Douma

BY Fisher & Swain

ATTORNEYS

United States Patent Office 2,734,169

Patented Feb. 7, 1956

2,734,169

DIRECTIONAL APPARATUS FOR USE WITH HIGH FREQUENCY TRANSMISSION LINES

Tjiske Douma, Haddonfield, N. J., assignor to Sierra Electronic Corporation, San Carlos, Calif., a corporation of California Application January 12, 1953, Serial No. 330,810

4 Claims. (Cl. 324—95)

This invention relates generally to directional coupling apparatus for use with high frequency transmission lines.

In my co-pending application Serial No. 330,808, filed of even date herewith, and entitled "Directional Apparatus for Use With High Frequency Transmission Lines," there is disclosed coupling apparatus which can be used to obtain a null reading for proper match between a high frequency line and an associated load. Such apparatus is applicable over a wide frequency range when the load appears as a pure resistance. However, when the load is complex, it has a phase angle which changes with frequency, and this makes it impossible to obtain the desired null reading over a substantial frequency range.

It is an object of the present invention to provide coupling apparatus of the above character which can be used to obtain a null indication over a wide frequency range, with a complex load.

It is a further object of the invention to provide wide band directional coupling apparatus which incorporates means serving to automatically compensate for a change in phase angle of the load, for different operating frequencies.

Additional objects and features of the invention will appear from the following description in which the preferred embodiments of the invention have been set forth in detail in conjunction with the accompanying drawing.

Referring to the drawing.

Figure 1:
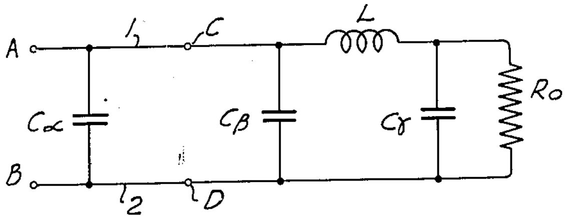
Figure 1 is a circuit diagram serving to illustrate theoretical considerations.

In Figure 1 it is assumed that the high frequency transmission line (conductors 1 and 2) is supplying a load comprising the resistance $R_0$, together with reactive elements of a pi network including the inductance L and capacitances $C_\alpha$, $C_\beta$, and $C_\gamma$. It is assumed that the entire network is adjusted whereby for a given frequency of operation it appears as a purely resistive load R. In a typical instance, a vacuum tube amplifier may be supplying high frequency voltage to transmission lines connected to points A and B, and the network may be adjusted to match the output impedance of the tubes.

In many practical applications of a directional coupler to such a system, it is necessary to make connections between points C and D, rather than A and B. The capacitance $C_\alpha$ is not available at C—D. It may for example consist of capacitance by virtue of vacuum tube amplifier, wiring, or transformer capacity. In such an application the directional coupler is connected between two capacitances $C_\alpha$ and $C_\beta$, which together form the first capacity of the pi network. The values of $C_\beta$ and $C_\gamma$ cannot be constant but must be changed with frequency, because the capacities and inductances of the pi network must be adjusted for each frequency to obtain the desired R at A—B. The impedance Z′ to the right of points C and D is not a pure resistance when the adjustment is such that the network appears as a pure resistance from A—B. Stated mathematically:

EQUATION 1

$$\frac{1}{R}=j\omega C_\alpha+\frac{1}{Z'}$$

or $$\frac{1}{Z'}=\frac{1}{R}-j\omega C_\alpha$$

where:

$\omega$ is the angular frequency,
Z′ is the impedance to right of points C and D, and
R is the impedance between points A and B (pure resistance).

It is evident from Equation 1 that Z′ consists of a pure resistance R with a negative capacity in parallel.

Figure 2:
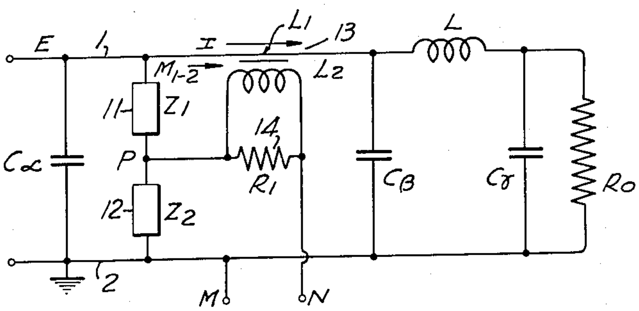
Figure 2 is a circuit diagram serving to schematically illustrate means for deriving a compensating voltage.

Figure 2 schematically illustrates application of a directional coupler to the network of Figure 1, the coupler being in accordance with the disclosure of said co-pending application. The conductor 2 in this instance is assumed to be grounded. The impedances 11 and 12 ($Z_1$ and $Z_2$), are connected in series between the conductors 1 and 2, and provide means for deriving a voltage proportional to the line voltage. A current transformer 13 ($L_1$, $L_2$) connects in series with the conductor 1, and provides means for deriving a voltage proportional to the line current. The resistor 14 ($R_1$) is connected in shunt with the secondary winding $L_2$ of transformer 13. One terminal of winding $L_2$ connects to the junction point of the impedances 11 and 12.

With proper selection of values the coupling arrangement described above is substantially directional. For high frequency energy flowing through the line in a forward direction, indicated by the arrow, the phase relationship between high frequency voltages developed between P and N, and P and M, are substantially 180° out of phase and of the same magnitude, and therefore no voltage is developed between points M and N. However, for energy flowing in a reverse direction, as for example energy reflected by the load, the phase relationship between the derived voltages is such that the resultant voltages developed between points M and N are additive to operate the voltage indicating means connected between the same.

Assuming that the directional coupler is used as illustrated in Figure 2, the equations for determining the voltage developed between points M and N are as follows:

EQUATION 2

$$V_{MN}=\left(\frac{Z_2}{Z_1+Z_2}\right)E-\left(\frac{j\omega M_{1-2}R_1}{j\omega L_2+R_1}\right)I$$

where:

E is the voltage between conductor 1 and ground,
I is the current in conductor 1,
$M_{1-2}$ is the mutual inductance between $L_2$ and $L_1$, and $$\frac{I}{E}=\frac{1}{R}-j\omega C_\alpha$$

so that $$\frac{V_{MN}}{E}=\frac{Z_2}{Z_1+Z_2}-\left(\frac{j\omega M_{1-2}R_1}{j\omega L_2+R_1}\right)\left(\frac{1}{R}-j\omega C_\alpha\right)$$

For zero voltage between points M and N, the right hand part of Equation 2 must be zero. When the load is a pure resistance R, the part $$\frac{Z_2}{Z_1+Z_2}-\left(\frac{j\omega M_{1-2}R_1}{j\omega L_2+R_1}\right)\left(\frac{1}{R}\right)$$

can be made zero in the same manner as previously described. However, to compensate for the remaining term $$\left(\frac{j\omega M_{1-2}R_1}{j\omega L_2+R_1}\right)(j\omega C_\alpha)$$

I provide means which adds to $V_{MN}$ another compensating voltage. As a first approximation, this voltage must be proportional to $\omega$ (i. e. to the frequency). This is because:

EQUATION 3

$$\left(\frac{j\omega M_{1-2}R_1}{j\omega L_2+R_1}\right)(j\omega C_\alpha)\approx\left(\frac{M_{1-2}}{L_2}\right)(R_1 j\omega C_\alpha)$$

when $$R\ll\omega L_2$$

Figure 3:
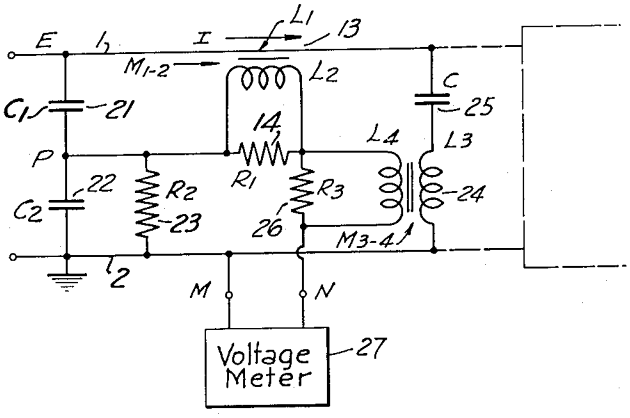
Figure 3 is a circuit diagram illustrating a directional coupler in accordance with the present invention.

In Figure 3 condensers 21 and 22, forming the capacities $C_1$ and $C_2$, are connected in series between the conductors 1 and 2, the latter being grounded. Condenser 21 may be incorporated as a structural part of the transformer 13, in the same manner as disclosed in said copending application. Condenser 22 is shunted by the resistor 23 ($R_2$), to form the impedance 12. The means for developing compensating voltages includes the transformer 24 ($L_3$, $L_4$) and the condenser 25 ($C$). The primary, $L_3$, of the transformer 24 connects in series with the condenser 25, and between the conductors 1 and 2. The secondary, $L_4$, of transformer 24 is connected between one side of the secondary of transformer 13 and the terminal N, and is shown shunted by resistor 26 ($R_3$). The transformer 24 is employed to change the phase of the compensating voltage 180°. This transformer introduces a phase error, which however, can be kept small by maintaining the impedance of the load ($R_3$) of the transformer relatively small compared with the impedance of the secondary open circuit inductance $L_4$.

Assuming that a voltage meter 27 of the vacuum tube type is connected to the points M and N, the meter can be made to read zero when the impedance of the load is adjusted for perfect matching with the source. Assuming a proper selection of values for the various elements, readjustments of the load to secure matching at different frequencies over a substantial frequency range will continue to provide a null or zero reading of the meter 27. This is because the compensating voltage derived by the transformer 24 together with condenser 25, compensates for a change in phase angle of the load.

Figure 4:
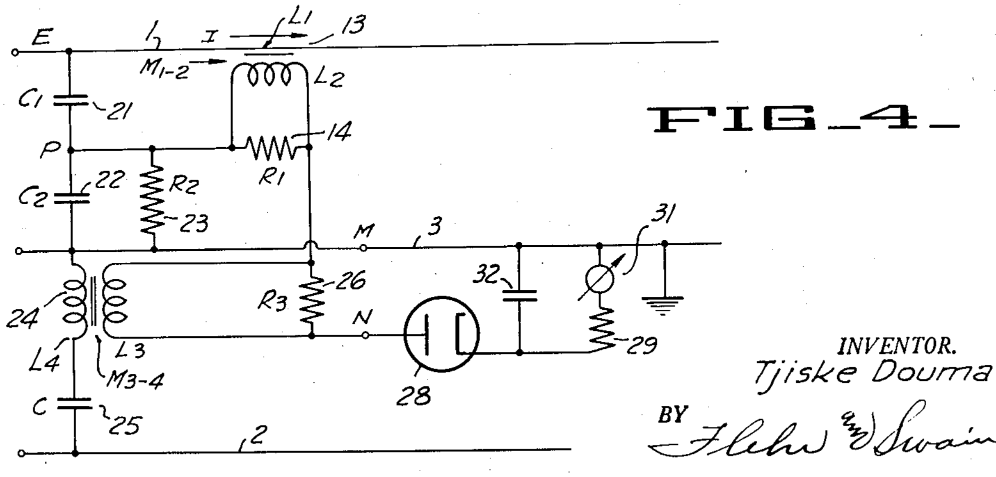
Figure 4 is another embodiment of the invention in which connections are made from two conductors of a transmission line to ground.

Figure 4 illustrates an arrangement which facilitates more symmetrical loading of the line. In this case the condensers 21 and 22 connect between ungrounded conductor 1 and grounded conductor 3, and the transformer 24 and condenser 25 are connected between ungrounded conductor 2 and grounded conductor 3. Condensers 21 and 25 are made equal in value. Instead of utilizing a voltmeter of the vacuum tube type, the arrangement of Figure 6 makes use of a rectifying diode, together with a current indicating meter, such as one of the microampere type. Thus the diode 28 has its anode connected to point N, and its cathode connected to ground through the resistor 29, and the meter 31. The meter and resistor 29 are shown shunted by the by-pass condenser 32.

With respect to the arrangements of Figures 3 and 4, a mathematical explanation is as follows: The voltage $V_{MN}$ consists of three parts, namely the voltage across $R_2$, the voltage across $R_1$, and the voltage across $R_3$. The voltage $V_{R2}$ across $R_2$ can be expressed by the equation:

EQUATION 4

$$V_{R2}=\left(\frac{Z_2}{Z_1+Z_2}\right)E=\left(\frac{1}{+\frac{C_2}{C_1}+\frac{1}{j\omega C_1 R_2}}\right)E$$

The voltage $V_{R1}$ across $R_1$ can be expressed by the equation:

EQUATION 5

$$V_{R1}=\left(-\frac{j\omega M_{1-2}R_1}{j\omega L_2+R_1}\right)I=-\left(\frac{j\omega M_{1-2}R_1}{j\omega L_2+R_1}\right)\frac{IE}{E}$$

substituting $$\frac{1}{R}-j\omega C_\alpha \text{ for } \frac{I}{E}$$

we have $$V_{R1}=-\frac{j\omega M_{1-2}R_1}{j\omega L_2+R_1}\left(\frac{1}{R}-j\omega C_\alpha\right)E$$

The voltage $V_{R3}$ across $R_3$ can be expressed by the equation:

EQUATION 6

$$V_{R_3}=\frac{Ej\omega M_{3-4}R_3}{(j\omega M_{3-4})^2+\left(\frac{1}{j\omega C}+j\omega L_3\right)(R_3+j\omega L_4)}=$$

$$-\frac{E\frac{M_{3-4}}{L_4}R_3}{\frac{1}{j\omega C}\left(1+\frac{R_3}{j\omega L_4}\right)+j\omega L_3(1-K^2)+\frac{L_3}{L_4}R_3}\approx$$

$$-\frac{EM_{3-4}}{L_4}j\omega CR_3$$

where $M_{3-4}$ is the mutual inductance between primary $L_3$ and secondary $L_4$, and K is the coefficient of coupling, $$\frac{M_{3-4}}{\sqrt{L_3L_4}}$$

The final expression in this equation representing voltage across $R_3$ is a good first approximation when:

$$R_3\ll\omega L_4,\ 1-K^2\ll 1,\text{ and } R_3\ll\frac{1}{\omega C}$$

The phases of the voltages represented by Equations 5 and 6 can be changed 180° by changing the direction of the transformer winding of $L_3$ or $L_4$. Adding the voltages across $R_1$, $R_2$, and $R_3$ gives the equation:

EQUATION 7

$$\frac{V_{MN}}{E}=\frac{1}{1+\frac{C_2}{C_1}+\frac{1}{j\omega C_1R_2}}-\frac{j\omega M_{1-2}R_1}{j\omega L_2+R_1}\left(\frac{1}{R}-j\omega C_\alpha\right)-$$

$$\frac{M_{3-4}}{L_4}(j\omega CR_3)=\frac{1}{1+\frac{C_2}{C_1}+\frac{1}{j\omega C_1R_2}}-\frac{1}{\frac{L_2R}{M_{1-2}R_1}+\frac{R}{j\omega M_{1-2}}}+$$

$$\frac{\frac{M_{1-2}}{L_2}(R_1j\omega C_\alpha)}{1+\frac{R_1}{j\omega L_2}}-\frac{M_{3-4}}{L_4}(R_3j\omega C)$$

Theoretically, the first two terms of Equation 7 can be made to cancel over an infinitely wide frequency range. The last two terms can be made to cancel over a relatively broad frequency range when $R_2 << \omega L_2$. This relationship is usually true, particularly at the higher frequencies. At the low frequency end, the last two terms are relatively small compared to the first two, so that the error involved is negligible when they do not completely cancel.

From Equation 7 design formulas can be derived for the construction of a directional coupler suitable for incorporation in the arrangements of Figures 3 or 4. These design formulas are as follows:

*Formula 1*

$$\frac{R}{1+\frac{C_2}{C_1}}=\frac{M_{1-2}R_1}{L_2}$$

*Formula 2*

$$C_1R_2=\frac{M_{1-2}L_2}{L_2R}=\frac{M_{1-2}}{R}$$

*Formula 3*

$$\frac{M_{3-4}R_3C}{L_4}=\frac{M_{1-2}R_1C_\alpha}{L_2}$$

In the above design formulas the load consists of R with $C_\alpha$ in parallel. Therefore, R and $C_\alpha$ have given values. The coupler elements C, $C_1$, $C_2$, $R_1$, $R_2$, $R_3$, $L_2$, $$\frac{M_{1-2}}{L_2}$$

and $$\frac{M_{3-4}}{L_4}$$

must be chosen so that their loading effect on the line remains small.

By way of example, I have constructed apparatus suitable for operation over a frequency band of from 30 to 600 kc. In one design of such apparatus, R equaled 1500 ohms and $C_\alpha$ equaled 200 mmf. For this case, values were chosen whereby C and $C_1$ equaled 10 mmf., $L_2$ equaled 25 millihenries, $$\frac{M_{1-2}}{L_2}$$

equaled $$\frac{1}{100}$$

and $R_1$ equaled 1000 ohms; then from Formula 1: $C_2$=1490 mmf.; from Formula 2: $R_2$=16,700 ohms. In Formula 3 we choose $$\frac{M_{3-4}}{L_4}=1$$

and then $R_3$=200 ohms.

At 30 kc. the first two terms in Equation 7 become:

$$\frac{1}{150-31.8j}=.0065+.00137j$$

the third term becomes:

$$\frac{.000377j}{1-.212j}=-.000078+.000368j$$

and the fourth term becomes:

$$-.000377j$$

At 600 kc. the first two terms in Equation 7 become:

$$\frac{1}{150-1.59j}=.00667+.00007j$$

the third term becomes:

$$\frac{.00754j}{1-.0106}=-.00008+.00754j$$

and the fourth term becomes:

$$-.00754j$$

It is evident from the above that for a relatively low frequency such as 30 kc., the phase angle correction made by $R_2$ is relatively important, but the correction necessary because of the presence of $C_\alpha$ is relatively minor. However, at the high frequency end of the band, namely 600 kc., the phase angle correction made by $R_2$ is relatively minor (so that the value of $R_2$ is not highly critical), but the voltage developed by virtue of presence of $C_\alpha$ is of the same order as that caused by R alone. In other words, for this frequency the correction made by the voltage across $R_3$ is a necessity.

It is evident from the foregoing that my invention makes possible a wide band directional coupler suitable for use with a load which consists of a resistance together with a negative capacity in parallel. In practice this means that when a directional coupler is made in accordance with the present invention and employed for adjusting a complex load to match the impedance of a high frequency transmission line, there is an automatic compensation for the change in phase angle of the load with different frequencies, thereby making possible a null reading over a broad frequency range.

I claim:

1. In high frequency directional apparatus for use over a substantial frequency range with transmission lines of the type which serve to supply frequency energy to a complex energy absorbing load, means forming a relatively high impedance in shunt with the line for deriving a voltage proportional to the line voltage, said means comprising first and second capacitances in series and arranged to form a voltage divider, a winding associated with one conductor of the transmission line and functioning as a current transformer, means for deriving voltages proportional to the frequency of the energy, said last means including a second transformer connected across the line in series with a condenser, and means serving to connect said winding in series with said second capacitance and also in series with the secondary of said second transformer, and voltage indicating means connected to indicate the resultant voltage across the terminals of said last named series connections.

2. Apparatus as in claim 1 together with a resistor connected in shunt across the secondary winding of the second transformer, the resistor having a value which is relatively small with respect to open circuit impedance of the winding.

3. In high frequency directional apparatus for use with transmission lines of the type employed to supply high frequency energy to complex load, means forming a high impedance in shunt with the line for deriving a voltage proportional to the line voltage, means forming a relatively low impedance in series with the line for deriving a voltage proportional to the line current, said derived voltages being out of phase for energy transfer in one direction, means for combining said first two derived voltages, means for deriving a voltage proportional to the frequency of the energy flowing along the line comprising a transformer in series with a capacitor, means for adding said last named voltage to said combined voltages to correct for the phase shift arising when operating over a wide frequency range, and means for securing an indication in response to the resulting voltage.

4. In high frequency directional apparatus for use with transmission lines of the type which serve to supply a high frequency energy to a complex energy absorbing system or load, means forming a relatively high impedance in shunt with the line for deriving a voltage proportional to the line voltage, said means comprising capacitances in series and arranged to form a voltage divider, means forming a relatively low impedance in series with the line for deriving a voltage proportional to the line current, said last means including a current transformer, means for deriving a voltage proportional to the frequency of the energy flowing along the line including a transformer in series with a capacitor, means for combining said first two derived voltages which are out of phase for energy transferred in one direction over a relatively narrow band of frequencies, means for adding the frequency sensitive voltage to said combined voltages to correct for phase shifts which arise when operating over a wide frequency range, and means for securing an indication in response to the resulting voltage.

References Cited in the file of this patent

UNITED STATES PATENTS

| | | |
|---|---|---|
| 2,443,097 | Crosby | June 8, 1948 |
| 2,614,139 | Baxter | Oct. 14, 1952 |